United States Patent [19]

Karim et al.

[11] 4,225,550

[45] Sep. 30, 1980

[54] PROCESS FOR MOLDING ACETYLENE END-CAPPED POLYIMIDE OLIGOMERS

[75] Inventors: Khalid A. Karim; James H. Rea, both of Houston, Tex.

[73] Assignee: Gulf Oil Corporation, Pittsburgh, Pa.

[21] Appl. No.: 963,615

[22] Filed: Nov. 24, 1978

[51] Int. Cl.³ ............................................. B29C 25/00
[52] U.S. Cl. ................................... 264/236; 264/331; 264/347; 528/126; 528/128
[58] Field of Search ............... 264/126, 109, 331, 234, 264/236, 345, 347; 528/126, 128

[56] References Cited

U.S. PATENT DOCUMENTS

| | | | |
|---|---|---|---|
| 3,413,394 | 11/1968 | Jordan | 264/126 |
| 3,439,082 | 4/1969 | Riley | 264/126 |
| 3,845,018 | 10/1974 | Bilow et al. | 528/128 |
| 3,879,349 | 4/1975 | Bilow et al. | 528/126 |
| 4,108,836 | 8/1978 | Bilow | 528/128 |

*Primary Examiner*—Jeffery R. Thurlow
*Attorney, Agent, or Firm*—Richard L. Kelly

[57] ABSTRACT

Fine particles of acetylene end-capped polyimide oligomers are copression-molded at ambient temperature. The preformed moldings are cured without melting the resin by heating to an elevated temperature which is lower than the oligomer's melting point.

4 Claims, No Drawings

PROCESS FOR MOLDING ACETYLENE END-CAPPED POLYIMIDE OLIGOMERS

BACKGROUND OF THE INVENTION

U.S. Pat. Nos. 3,845,018 and 3,879,349 disclose certain acetylene end-capped polyimide oligomers. Moldings prepared from such resin have excellent physical properties which are largely retained at temperatures as high as 316° C. (600° F.).

These oligomers have very high melting points above 210° C. and require extended heating cycles to crosslink the resins to develop optimum physical properties. For these reasons, the molding cycles are long and moldings prepared from such oligomers are expensive.

The prior art discloses that it is necessary to employ high boiling solvents such as dimethylformamide (DMF) or N-methyl-2-pyrrolidone (NMP) to prepare these oligomers. Unless special precautions are employed to remove such solvents from the oligomers, residual solvent evolves when the oligomers are molded. This action frequently causes the moldings to crack and/or fracture. It also is observed that large moldings sometimes crack when they are post cured by being heated to 371° C. (700° F.) for extended periods of time, due to stresses caused by large changes in thermal expansion.

For the above reasons, there is a need in the art for improved processes for molding acetylene end-capped polyimide oligomers.

SUMMARY OF THE INVENTION

An improved process is provided for preparing moldings of acetylene end-capped polyimide oligomers. In the process, fine oligomer particles, at least 50 weight % of which will pass through a 28-mesh acreen (U.S. Standard) are subjected to a pressure of at least about 50,000 psi at ambient temperature to form a preformed molding having a density of at least about 1.23 gms/ml. The preformed molding then is heated to an elevated temperature of less than about 210° C. for a period of time sufficient to crosslink the molding.

DETAILED DESCRIPTION OF THE INVENTION

An essential feature of the invention is that fine particles of the acetylene end-capped polyimide oligomers are compression-molded to prepare a preform of the finished part that has a desirably high density. The preformed molding consists of a multitude of tiny resin particles which are bonded together at their touching surfaces by physical forces. The preformed molding, however, is slightly porous so that any vapors liberated in the second step of the process can escape without causing cracks, blisters or fractures to develop in the molding.

The acetylene end-capped polyimide oligomer is ground to a particle size such that at least 50 weight % of the resin particles will pass through a 28-mesh and preferably a 60-mesh screen (U.S. Standard). The particles preferably will be as uniform in size as can be obtained on a practical basis.

The female section of the mold will be filled with the resin particles and lightly compacted to fill all sections before the mold is sealed and pressurized with the male mold member. The minimum molding pressure required will depend somewhat upon the mold configuration and the resin particle size. In all cases, the pressure employed will be sufficient to prepare a preformed molding having a density of at least about 1.23 and preferably at least about 1.28 gms/ml. With most molds, a pressure of above 50,000 and preferably about 75,000 psi is employed.

The density of the preformed molding also is affected by the molding temperature, with higher densities being obtained as the mold temperature is increased. It is preferred, however, to run the compression molding step at substantially ambient temperature and to control the preformed molding density by control of the resin particle size (small particles give higher densities-other factors being held constant) and the molding pressure-with higher pressures giving higher densities, other factors being held constant.

Very short molding cycles can be employed in preparing the preformed moldings. With simple shapes, cycles as short as 5 seconds may suffice. With more complex mold shapes, cycles as long as 60 seconds may be employed to assure even compaction throughout the part. While longer cycles can be employed, no significant advantages are obtained thereby.

The preformed moldings, prepared as described above, then are cured by heating to a temperature below the melting point of the oligomer, preferably less than about 210° C. and especially less than about 180° C. The control of temperature is a critical element in the process. By operating below the melting point of the oligomer, the resins particles do not melt. The acetylene end groups of the oligomer will cross link at temperatures as low as 140°-150° C. When heated to these temperatures, acetylene end groups at the surface of the resin particles will inter-react with and cross link with acetylene end groups on the surface of touching resin particles. Thus, a network of cross-links will be established throughout the entire molding to provide a molded part having good physical properties. The strength of the finished part will depend principally on the density of the preformed molding. The higher this density, the greater the strength of the finished molding. The time cycle and the temperature employed can be varied widely, but suitable conditions can be established with a relatively few tests for any given shape of molding. Heating for 8 hours at 170° C. followed by 4 hours at 180° C. is suitable for most moldings.

After the preformed molding has been heated for a few hours as described above, a sufficient percentage of the acetylene end groups will have cross-linked so that the oligomer no longer will melt. After this stage has been reached, the curing temperature can be increased above 210° C. and by doing so the part will keep its dimensional integrity at high temperatures.

Since the oligomers are cured without melting the oligomer, the final cured molding will be slightly porous. This is an advantage in that, if any volatile components are released from the oligomer during curing, they will escape through the porous structure without causing blistering or fracture of the molded part.

The prior art teaches that the high temperature performance characteristics of moldings prepared from polyimides are improved by post curing the moldings. In the art, the term "post curing" has come to mean heating the molding to at least the temperature at which the molding is expected to operate and to maintain the molding at this temperature for at least one hour and preferably for several hours. Such post curing completes any cross linking of the resin and removes any small traces of volatile materials present in the molding.

It has been observed that large moldings (e.g. molding having a thickness>2") prepared from acetylene end-capped polyimide oligomers by prior art molding processes sometimes crack when post cured. Moldings prepared by the process of the present invention are almost totally free of any tendency to crack upon being post cured.

The acetylene end-capped polyimide oligomers employed in the invention have the structure:

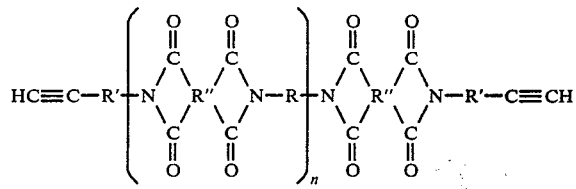

where n has an average value of from 1 to about 10, where each of R and R' is independently selected from the group consisting of a phenylene group, a naphthalene group, or

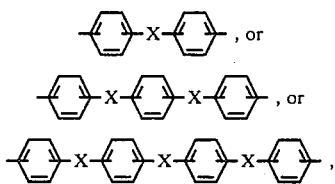

where X is

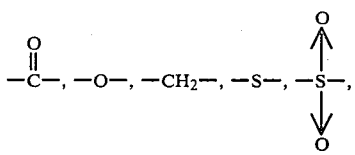

—CF$_2$—, or a bond,
and where R" has the structure:

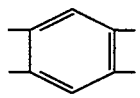

or

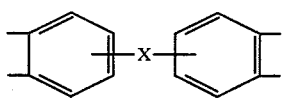

and where X is as defined above.

The acetylene end-capped polyimide oligomers can be prepared by methods reported in the literature. See U.S. Pat. Nos. 3,845,018 and 3,879,349.

Moldings can be prepared from mixtures of the particulate acetylene end-capped polyimide oligomers and finely-divided fillers such as talc, graphite, glass fibers, and the like. While the two components can be employed in a wide range of ratios, it is preferred to employ 40–95 weight % of oligomer and, correspondingly, 60–5 weight % of filler.

The following examples are set forth to illustrate the principle and practice of the invention to those skilled in the art.

EXAMPLE I

Part A

An acetylene end-capped polyimide oligomer was prepared from 1 molar equivalent of 1,3 bis (3-aminophenoxy) benzene (APB), 2 molar equivalents of 3,3'4,4'-benzophenonetetracarboxylic acid dianhydride (BTDA), and 2 molar equivalents of 3-aminophenylacetylene (APA) following the general procedures shown in U.S. Pat. No. 3,845,018. The dried resin was ground to a powder having the following sieve analysis:

| Screen Size (U.S. Standard) | Wt. % of Particles Retained on Screen |
|---|---|
| 28 | 29 |
| 60 | 14 |
| 80 | 22 |
| 100 | 26 |
| 150 | 7 |
| 200 | 1 |

Part B

An aliquot of the powdered resin of Part A was firmly packed into a female bar mold member measuring 2½"×½"×⅛". The male mold member then was inserted and the mold was subjected to a pressure of 56,000 psi for 5 seconds. The preformed molding had a density of about 1.30 gms/ml and had sufficient strength to be handled without damage.

Part C

The preformed molding of Part B was cured by heating in an oven for 8 hours at 170° C. and 4 hours at 180° C. The cured molding had a density of about 1.31 gms/ml, had shrunk less than about 1%, and had a weight loss of less than 2% (both values as compared to the volume and weight of the preformed molding). The molding had a flexural modulus of about 470,000 psi and a flexural strength of about 8,200 psi.

EXAMPLE II

Preformed moldings prepared as described in Example I, Part B, were cured by being heated from room temperature to 170° C. at a uniform rate over a period of 3 hours, then being heated to 220° C. at a uniform rate over a period of 8 hours, and finally being heated to 250° C. at a uniform rate over a period of 2 hours. After cooling to room temperature, the moldings were post cured by being heated to 232° C. and held at this temperature for 4 hours, by then being heated to 316° C. and held at this temperature for 4 hours, and finally by being heated to 371° C. and held at this temperature for 12 hours. The post cured moldings showed no cracks, had an average flexural modulus of 570,000 psi and an average flexural strength of 10,200 psi.

EXAMPLE III

Part A

The molding powder of Example I, Part A, was ground finer and screened to provide a very fine sample, substantially all of which would pass through a 400-mesh screen (U.S. Standard). Employing the mold described in Example I, Part B, preformed moldings were prepared by compressing the powder for 30 seconds at various pressures to show the effect of pressure on the density of the preformed molding. The results are shown in Table I.

TABLE I

| Molding Pressure | Preformed Molding Density, gms/ml |
|---|---|
| 11,000 | 1.154 |
| 17,000 | 1.199 |
| 35,000 | 1.246 |
| 45,000 | 1.272 |
| 56,000 | 1.293 |

Part B

The 400-mesh product of Part A above was molded for 30 seconds at 56,000 psi with the mold being preheated to 150° C. The density of the preformed molding was 1.328 gms/ml.

EXAMPLE IV

The powdered resin of Example I, Part A, was dry blended with various percentages of finely-divided graphite or talc. Performed moldings of the compounded resins were prepared employing the conditions described in Example I, Part B. The preformed moldings were cured and post cured employing the heating cycles described in Example II. The percent shrinkage and weight loss, compared to the preformed molding, are shown in Table II.

TABLE II

| Composition | % Shrinkage | % Weight Loss |
|---|---|---|
| 90% Resin 10% Graphite | 2.3 | 1.9 |
| 80% Resin 20% Graphite | 3.3 | 2.1 |
| 70% Resin 30% Graphite | 3.2 | 2.5 |
| 60% Resin 40% Graphite | — | 2.2 |
| 60% Resin 40% Talc | 1.9 | 1.7 |
| 50% Resin 50% Talc | 2.2 | 1.8 |

What is claimed:

1. In a process for preparing a thermoset molding of an acetylene end-capped polyimide oligomer; the improvement which consists essentially of:
   a. Filling a mold with acetylene end-capped polyimide oligomer particles of a size such that at least 50 weight % of said particles will pass through a 28-mesh screen (U.S. Standard),
   b. Subjecting the particles to a pressure of at least about 50,000 psi at ambient temperature to prepare a preformed molding having a density of at least about 1.23 gms/ml, and
   c. Removing the preformed molding from the mold and heating it to a temperature below the melting point of said oligomer for a period of time sufficient to cross link the molding;
where the acetylene end-capped polyimide oligomer has the structure:

$$HC\equiv C-R'-\left[N\begin{smallmatrix}C\\C\end{smallmatrix}R''\begin{smallmatrix}C\\C\end{smallmatrix}N-R-\right]_n N\begin{smallmatrix}C\\C\end{smallmatrix}R''\begin{smallmatrix}C\\C\end{smallmatrix}N-R'-C\equiv CH$$

where n has an average value of from 1 to about 10, where each of R and R' is independently selected from the group consisting of a phenylene group, a naphthalene group, or (i) —⌬—X—⌬—, or (ii) —⌬—X—⌬—X—⌬—, or (iii) —⌬—X—⌬—X—⌬—X—⌬—, where X is $$-\overset{O}{\underset{\|}{C}}-,\ -O-,\ -CH_2-,\ -S-,\ -\overset{O}{\underset{O}{\overset{\uparrow}{\underset{\downarrow}{S}}}}-$$

—CF$_2$—, or a bond, and where R'' has the structure:

⌬⌬ (fused bicyclic)

or

⌬—X—⌬ and where X is as defined above.

2. A process of claim 1 in which the preformed molding is prepared by subjecting the resin particles to sufficient pressure to provide a preformed molding having a density of at least about 1.28 gms/ml.

3. A process of claim 1 or 2 in which the preformed molding is cured by being heated for a period of at least 12 hours at a temperature of at least about 170° C.

4. A process of claim 1 or 2 in which R has the structure:

—⌬—O—⌬—O—⌬—

R' is a phenylene group, and R'' has the structure:

⌬—C(=O)—⌬

* * * * *